United States Patent
Nielsen et al.

(10) Patent No.: US 7,329,291 B2
(45) Date of Patent: Feb. 12, 2008

(54) PROCESS FOR THE PREPARATION OF HYDROGEN AND SYNTHESIS GAS

(75) Inventors: Poul Erik Højlund Nielsen, Fredensborg (DK); Jens Perregaard, Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 429 days.

(21) Appl. No.: 10/989,306

(22) Filed: Nov. 17, 2004

(65) Prior Publication Data
US 2005/0108941 A1 May 26, 2005

(30) Foreign Application Priority Data
Nov. 22, 2003 (DK) ............................... 2003 01727

(51) Int. Cl.
*C01B 3/36* (2006.01)
*B01J 8/00* (2006.01)
(52) U.S. Cl. ................... 48/197 R; 48/198.7; 48/127.9
(58) Field of Classification Search .............. 48/197 R, 48/198.1, 198.7, 127.9; 423/650–654
See application file for complete search history.

(56) References Cited

U.S. PATENT DOCUMENTS

| 3,393,979 | A | 7/1968 | Desmond et al. |
| 4,407,238 | A | 10/1983 | Yoon |
| 4,847,000 | A | 7/1989 | Vu et al. |
| 6,583,084 | B2 | 6/2003 | Hagihara et al. |
| 6,589,909 | B2 | 7/2003 | Yoshimura et al. |
| 6,699,457 | B2 | 3/2004 | Cortright et al. |
| 2003/0170171 | A1 | 9/2003 | Cortright et al. |

*Primary Examiner*—Glenn Caldarola
*Assistant Examiner*—Tom Duong
(74) *Attorney, Agent, or Firm*—Dickstein Shapiro LLP

(57) ABSTRACT

Process for production of synthesis gas comprising carbon monoxide, carbon dioxide and hydrogen by reforming of methanol including the steps of:
(a) introducing methanol in liquid phase into a reactor containing a solid methanol reforming catalyst suspended in a liquid phase of methanol and water;
(b) reacting the liquid phase of methanol and water in presence of the suspended catalyst at a pressure and temperature, where methanol is maintained in the liquid phase; and
(c) withdrawing from the reactor a gas phase of synthesis gas being produced during reaction of the liquid methanol and water phase.

7 Claims, No Drawings

PROCESS FOR THE PREPARATION OF HYDROGEN AND SYNTHESIS GAS

The present invention relates to conversion of methanol and methanol derivatives such as formaldehyde and/or methylformiate into synthesis gas and in particular hydrogen. In particular, the invention is a hydrogen preparation process being carried out in a slurry bed reactor, wherein liquid methanol is decomposed into hydrogen and other synthesis gas components. Methanol feed is utilised as suspension medium for a catalyst being active in methanol decomposition reactions. The suspension medium and methanol feed may also contain water.

Synthesis gas prepared by the process is any gas composition comprising hydrogen and carbon dioxide and/or carbon monoxide.

BACKGROUND OF INVENTION

Heterogeneous methanol reforming is industrial practice carried out by reacting methanol in the presence of copper-based catalysts according to the following equations:

$$CH_3OH + H_2O = 3H_2 + CO_2 \quad (1)$$

$$CH_3OH = 2H_2 + CO \quad (2)$$

The methanol reforming catalyst also catalyses the Water Gas Shift (WGS) reaction, $$CO + H_2O = CO_2 + H_2 \quad (3)$$

and the Reverse Water Gas Shift (RWGS) reaction, $$CO_2 + H_2 = CO + H_2O \quad (4)$$

In large-scale hydrogen plants, the main route for the preparation of hydrogen rich gas is steam reforming of hydrocarbons. Typically, the hydrocarbon feed is subjected to a purification step where traces of sulphur, chloride etc. is removed. From the purification step the feed is heated and steam-reformed in fired tubular reactors. The usual temperature range for steam reforming is 700-1100° C. The reactor is heated with fired heaters. Alternatively, an autothermal reforming can be used.

It is further known to steam reform methanol to synthesis gas involving the above mentioned reaction (1) and (4). Both reactions are moderately endothermic and methanol reforming is favoured by low pressure. The conversion is limited by the thermodynamic equilibrium constant. Typically a temperature of 250-300° C. is used at moderate pressures. The reaction is usually carried out in the gas form, wherein gaseous phase of methanol and steam is contacted with a methanol reforming catalyst.

Several catalysts are known to be active in steam reforming of methanol to hydrogen in the gas phase. Those catalyst compositions include copper, zinc, palladium and/or platinum (U.S. Pat. No. 6,583,084), aluminum, copper and at least one metal atom selected from iron, ruthenium and osmium (U.S. Pat. No. 6,589,909) and manganese, copper and chromium (U.S. Pat. No. 4,407,238). The most typical catalysts being employed in the industry are the copper, zinc and aluminum and/or chromium catalysts.

U.S. Pat. No. 6,699,457 discloses a process for the production of hydrogen from oxygenated hydrocarbons in the vapour phase or condensed liquid phase in the presence of a metal-containing catalyst. The catalysts contain a Group VIII transition metal or alloys of the metals. Preferred catalysts for this process are nickel, palladium, platinum, ruthenium and rhodium iridium. The oxygenated hydrocarbons for use in the process have from 2 to 12 carbon atoms. When the reforming reaction is carried out in the liquid phase, glucose, sorbitol and sucrose are a preferred feed stock for the reaction.

It has now been found that methanol reformable in the liquid phase by contact with a copper-zinc-aluminum oxide and/or chromium oxide catalyst being suspended in a suspension liquid comprising methanol and water, whereby hydrogen or synthesis gas is formed at the surface of the catalyst and leaves the reactor in the gas phase.

SUMMARY OF THE INVENTION

Accordingly, this invention provides a process for the production of hydrogen or synthesis gas comprising carbon monoxide, carbon dioxide and hydrogen by reforming of methanol including the steps of:

(a) providing a suspension of a catalyst comprising oxides of copper, zinc, aluminum and/or chromium in methanol and water in liquid phase;

(b) introducing a feed stock comprising methanol in the liquid phase into a reactor containing a solid methanol reforming catalyst suspended in a liquid phase of methanol and water;

(b) reacting the feed stock in the liquid phase of in presence of the suspended catalyst at an operation pressure and temperature, where methanol is maintained in the liquid phase; and (c) withdrawing a gas phase of hydrogen or synthesis gas from the liquid phase.

The process according to the invention exploits the condensing conditions of the methanol feed. The methanol partial pressure being calculated from the gas phase equilibrium constant is larger than the boiling pressure of methanol at the given temperature and results in a liquid phase containing methanol and water. Since hydrogen or synthesis gas is in the gas phase, the above reactions are not limited by equilibrium, when the gas phase is continuously withdrawn from the liquid reaction medium. The equilibrium and saturation composition is affected by temperature. For an increase in temperature, the pressure needs to be increased to obtain liquid phase reaction conditions.

The liquid phase methanol reforming process according to the invention represents a solution to the heat-addition problem in the known methanol reforming process by installation of a heat-exchange-surface in the reactor. By the liquid phase reaction, the temperature is controlled in simplified manner and temperature gradients are not formed. Hence a more efficient use of the catalyst is obtained.

DETAILED DESCRIPTION OF THE INVENTION

By the invention methanol reforming in the liquid phase producing synthesis gas is carried out on the surface of catalyst suspended in methanol and water. The fraction of water can be tolerated up to 50% by volume in the catalyst suspension without a significant deactivation of the catalyst.

In the process a feed of liquid methanol is fed to a reactor e.g. by means of a pump. The liquid methanol can contain water. In the reactor a catalyst active in the methanol reforming reaction is suspended in a mixture of methanol and water. In the reactor methanol is reformed according to:

$$CH_3OH + H_2O = 3H_2 + CO_2 \quad (1)$$

$$CH_3OH = 2H_2 + CO \quad (2)$$

and the Reverse Water Gas Shift (RWGS) reaction, $$CO_2 + H_2 = CO + H_2O \tag{4}$$

The product is a synthesis gas containing hydrogen, carbon-mono-oxide and carbon dioxide.

The process is advantageously operated as a once-through process.

The feed stock being introduced into the reactor is controlled in such a manner that the reactor contains a liquid phase. The pressure and temperature in the catalyst suspension have to be adjusted to critical values, where the feed stock and the suspension medium of the catalyst bed are maintained in the liquid phase. Depending on the operation temperature the pressure at which the process is operated in the liquid phase will be typically between 0.1 and 24 MPa at reaction temperatures between 50° C. and 240° C.

The product leaves the reactor in the gas phase. In order to minimise the amount of water and methanol living the reactor in gas phase, it is an option to include a heat exchanger on the exit line of the reactor. This heat exchanger reduces the temperature of the product gas phase and partly or completely condenses the traces of methanol and water present in the gas phase at the reaction conditions.

The catalyst to be employed in process is preferably a copper-zinc-aluminum catalyst containing 55 wt % copper oxide prior to activation and being available from Haldor Topsøe A/S, Denmark under the Tradename MDK-20. Beside methanol, other similar species like methyl formate, formaldehyde, dimethylether or formic acid may be used as feed and solvent.

EXAMPLES

Example 1

13.75 g of MDK-20, a catalyst for liquid phase methanol reforming available from Haldor Topsøe A/S, Denmark is activated by contact with a gas mixture of hydrogen and nitrogen in a basket inside a 300 cc reactor. After activation, the catalyst is suspended in 140 cc methanol containing 10 wt % of water. Nitrogen is added in order to reach a pressure of 2 MPa. The set-up is heated to 200° C. The total pressure is measured and a pressure increase above the partial pressure of methanol, water and the added nitrogen is observed. This batch experiments thus indicates that other additional gases are formed.

Example 2

13.75 g of the MDK-20 catalyst is activated and suspended as described in Example 1. The reactor is connected to a condenser and by means of a back-pressure valve the operation pressure is kept at 8 Mpa. A pump feeding 1 ml/min of a methanol/water mixture with water content of 10 wt % to the reactor is started. The composition of the dried product gas being withdrawn from the reactor is analysed and contains 74.9% $H_2$, 11.5% $N_2$, 0.8% CO and 12.7% $CO_2$. The production of the dried gas is 4.8 Nl per hour.

After 1.5 hours the gas production is still 4.8 Nl per hour. The concentration of nitrogen is decreased. The composition of the dried gas is 79.0% $H_2$, 10.8% $N_2$, 0.8% CO and 9.4% $CO_2$.

The invention claimed is:

1. A process for production of hydrogen or synthesis gas comprising carbon monoxide, carbon dioxide and hydrogen by reforming of methanol comprising the steps of:
   (a) providing a suspension of an activated catalyst comprising copper and oxides of zinc, aluminum and/or chromium in methanol and water, wherein both methanol and water are in liquid phase, to form a suspended catalyst;
   (b) introducing a feed stock comprising methanol in liquid phase into a reactor containing the suspended catalyst from step (a); and
   (c) reacting the feed stock in the liquid phase in presence of the suspended catalyst at an operation pressure and temperature, wherein methanol is maintained in the liquid phase to form a gas phase of hydrogen or synthesis gas.

2. The process of claim 1, wherein the amount of water being present in the liquid phase is 0-50 wt %.

3. The process of claim 1, wherein the operation pressure is between 0.1 and 24 MPa.

4. The process of claim 1, wherein the operation temperature is between 50° C. and 240° C.

5. The process of claim 1, wherein the feed stock further comprises water in liquid phase.

6. The process of claim 1, wherein the catalyst contains at least 30% by weight copper oxide prior to its activation.

7. The process of claim 1, wherein the catalyst contains at least 50% by weight copper oxide prior to its activation.

* * * * *